United States Patent Office 3,651,226
Patented Mar. 21, 1972

3,651,226
MITICIDAL COMPOSITIONS CONTAINING PHEN-YLAZOPROPENOATE ESTERS AND METHODS OF USE
Robert Earl Sticker, Middleport, N.Y., assignor to FMC Corporation, New York, N.Y.
No Drawing. Continuation-in-part of application Ser. No. 777,200, Nov. 19, 1968, which is a continuation-in-part of application Ser. No. 712,351, Mar. 12, 1968. This application Mar. 18, 1970, Ser. No. 20,839
Int. Cl. A01n 9/20
U.S. Cl. 424—226
10 Claims

ABSTRACT OF THE DISCLOSURE

A new class of miticides comprises phenylazopropenoate esters of the formula

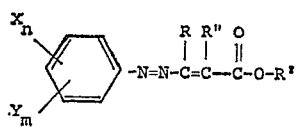

wherein R is hydrogen or an aliphatic group having one to three carbon atoms inclusive; R" is hydrogen or methyl; R' is a lower aliphatic hydrocarbon group, saturated or unsaturated, or lower alkoxyalkyl; X is halogen, lower alkyl, lower alkoxy, or lower alkylthio; Y is methyl or chloro; $n$ is 0 or 1; and $m$ is 0, 1, or 2. Synthesis of many of this class of compounds, their physical properties, and their effectiveness against mites and mite eggs are described.

CROSS REFERENCE TO RELATED APPLICATIONS

This is a continuation-in-part of my copending application Ser. No. 777,200, filed Nov. 19, 1968, now abandoned, which is a continuation-in-part of Ser. No. 712,351, filed Mar. 12, 1968, now abandoned.

BACKGROUND OF THE INVENTION

(1) Field of the invention

This invention pertains to the general field of the chemical control of pests affecting economic crops, particularly to the control of mites.

(2) Description of the prior art

It is known that certain azobenzenes show some miticidal activity and that certain unsymmetrical azo-compounds are insecticides. However, the high level of activity against mites, in particular against mite eggs, shown by the miticidal compositions of this invention has not been reported or suggested by the prior art.

Certain methyl and ethyl phenylazopropenoates have previously been synthesized, but the literature contains no suggestion that these compounds or related compounds have miticidal activity. See Van Alphen, Rec. Trav. Chim. 64, 109 and 305 (1945); and Dornow et al., Chemical Abstracts 49, 8302c (1955).

SUMMARY OF THE INVENTION

The invention pertains to miticides, including new compounds, to new miticidal compositions, and to a new method of controlling mites. The miticidal compounds of this invention are effective both against the active forms (larvae, nymphs, and adults) and against eggs. Particularly useful control is obtained of mites which infest fruit trees.

The miticidal compounds of this invention have the formula:

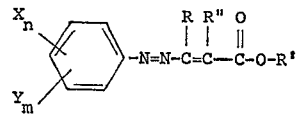

wherein R is hydrogen or an aliphatic group having one to three carbon atoms inclusive; R" is hydrogen or methyl; R' is a lower aliphatic hydrocarbon group, saturated or unsaturated, which may contain an ether linkage; X is halogen, lower alkyl, lower alkoxy, or lower alkylthio; Y is methyl or chloro; $n$ is 0 or 1; and $m$ is 0, 1, or 2.

Certain miticidal compounds preferred for ease of preparation, economy, and effectiveness are of the formula

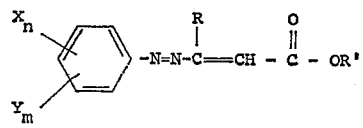

wherein R is hydrogen or methyl, R' is a lower aliphatic hydrocarbon, saturated or unsaturated, which may contain an ether linkage; X is chloro, bromo, methyl, or methoxy; Y is methyl or chloro; and $n$ and $m$ are each 0 or 1.

Particularly preferred are those compounds in which R is hydrogen or methyl, R' is lower alkyl, lower alkynyl, or lower alkoxyalkyl; X is in the para position and is hydrogen, methyl methoxy, or chloro; $n$ is 1, and $m$ is 0.

Control of mites is obtained by applying to the situs where control of mites or mite eggs is desired an effective amount of a miticidal compound of this invention. Usually the miticidal compound is applied as an essential active ingredient of a formulated miticidal composition which contains the miticidal compound in minor but effective amount, and a carrier in major amount, which carriers are usually pesticidally inert.

DETAILED DESCRIPTION

The preparation and miticidal activity of typical, useful compounds of this invention are illustrated below. All temperatures are expressed in degrees centigrade, and percentages by weight, unless otherwise stated.

EXAMPLE 1

Synthesis of 2-butynyl 3-((4-methylphenyl)azo)-2-butenoate (a) The intermediate 2-butynyl acetoacetate was prepared as follows: In a flask equipped with a mechanical stirrer, thermometer, dropping funnel, and a condenser fitted with a drying tube, a mixture of 70 grams of 2-butyn-1-ol and 0.2 gram of methanesulfonic acid was stirred and heated to 60°. While the stirred mixture was kept at 60–70°, 84 grams of diketene was added dropwise over a period of 1½ hours. After the addition was complete, the reaction mixture was maintained at 60–70° with stirring for two more hours, then heated to 90–100° and held in that higher temperature range for two additional hours. The source of heat was removed, and the reaction mixture was allowed to cool to room temperature while stirring was maintained for an additional 16 hours. The procedure was repeated, and products from four individual preparations were combined. The combined liquid products were washed successively with six 260 ml. volumes of an aqueous, saturated, solution of sodium bicarbonate and with six 250 ml. volumes of an aqueous, saturated sodium chloride solution. The washed product was dried over sodium sulfate, filtered, and distilled. That fraction distilling at 79–83° at 0.83–0.74 mm. Hg was identified by NMR and infrared spectroscopy as 2-butynyl acetoacetate.

(b) This intermediate ester was converted to 2-butynyl 2-chloroacetoacetate as follows: In a flask equipped with a stirrer, thermometer, dropping funnel and a condenser fitted with a gas scrubber, 161.3 grams of 2-butynyl acetoacetate was cooled to −5° to 0°. To the chilled ester was added with constant stirring 141 grams sulfuryl chloride over a period of about 4¼ hours. The reaction mixture was allowed to warm to room temperature and stirred for about 18 additional hours. The reaction product was taken into solution with 500 ml. methylene chloride and washed successively with three 250 ml. volumes cold, saturated, aqueous sodium bicarbonate, and three 200 ml. volumes of cold, saturated, aqueous sodium chloride. The solution was then dried over sodium sulfate, filtered, and the solvent removed in vacuo to yield 187.4 g. 2-butynyl 2-chloroacetoacetate, and amber liquid which partially crystallized on standing, identified by NMR and infrared spectroscopy.

(c) The chloroacetoacetate was converted to 2-butynyl 3-((4-methylphenyl)azo)-2-butenoate as follows: To a suspension of 157.7 grams 4-methylphenylhydrazine hydrochloride in 1.5 liters absolute ethanol, cooled to 5–10°, was added a cold solution of 270 grams sodium acetate trihydrate in 600 ml. water. This mixture was added to a chilled (5–10°) solution of 187.4 g. 2-butynyl 2-chloroacetoacetate in 2.0 liters absolute ethanol. A precipitate formed, and an additional 600 ml. ethanol was added to the reaction vessel to facilitate stirring. The reaction mixture was stirred for 1½ hours as it warmed to room temperature. The precipitated product, 2-butynyl 3-((4-methylphenyl)azo)-2-butenoate, was filtered and air dried to give 166.5 g., M.P.=72.5–73.5°. An additional 38.3 grams of crude product was obtained from the mother liquor via precipitation by addition of 3.2 liters water. Recrystallization from methanol gave an additional 27 grams of product, M.P.=72–73.5°.

*Analysis.*—Calc'd for $C_{15}H_{16}N_2O_2$ (percent): C, 70.29; H, 6.29; N, 10.93. Found (percent): C, 70.11; H, 6.05; N, 10.90.

EXAMPLE 2

Miticidal activity of 2-butynyl 3-((4-methylphenyl)azo)-2-butenoate (a) Miticidal activity against adult mites was evaluated in the following way: Leaves of growing pinto beans (*Phaseolus vulgaris*) were infested with two-spotted spider mites (*Tetranychus urticae*). Infestation was accomplished by placing a small section of highly infested plant leaf, containing 50 to 75 adult female mites, in an inverted position on the upper leaf surface of a growing bean seedling. After two to four hours, when mite migration to the growing plant leaf was complete, the seedling leaves were briefly immersed in an aqueous-acetone (10% acetone) solution containing 2-butynyl 3-((4-methylphenyl)azo)-2-butenoate at the desired concentration. At 1250 p.p.m. the miticide solution was made using the technical material, i.e. the chemical compound without extenders. At the lower concentrations the miticide used to make up test solutions was formulated as a 5% emulsifiable concentrate, containing 5% active ingredient, 90% xylene, and 5% of a mixture of surfactants (an alkylarylsulfonate, an ethylene oxide condensate of an alkylated phenol, and a polyalkylene glycol ether). Plants were maintained at 80° F. and 50% relative humidity for 48 hours, after which time counts were taken of dead and living female mites. Results are shown in Table I.

The novel compound of the invention also shows outstanding activity against mite eggs at concentrations significantly lower than those required to kill essentially all of the adults. This effectiveness as a mite ovicide is exemplified below.

(b) Activity against mite eggs was evaluated as follows: Leaves of growing pinto bean seedlings were infested with mites. Two to four hours later, when female mites had deposited eggs, adult mites were killed on plant leaves by treatment with an aqueous solution of tetraethyl pyrophosphate (TEPP) (936 p.p.m. active ingredient), a known miticide having essentially no effect on mite eggs. After the plant leaves had dried, they were dipped in an aqueous-acetone solution of miticide prepared as in (a) above. A ring of lanolin was placed around the plant stem to serve as a barrier preventing migration of mites. The plants were maintained at 80° F. and 50% relative humidity for seven days, after which time a count of unhatched eggs, and both dead and living larvae was taken. Results are shown in Table I.

TABLE I.—ACTIVITY OF 2-BUTYNYL 3-((4-METHYLPHENYL)AZO)-2-BUTENOATE AGAINST TWO-SPOTTED SPIDER MITES, ADULTS AND EGGS

| Active ingredient, p.p.m. | Percent kill | |
| --- | --- | --- |
| | Eggs | Adults |
| 1,250 | ---- | 100 |
| 156 | 95.9 | 76 |
| 78 | 91–8 | 24 |
| 39 | 59 | 18 |

These data show that the novel miticide of the invention is highly effective against mite eggs as well as against larvae and adults. It is, of course, apparent that an effective ovicide can severely interfere with the ability of a mite population to maintain itself. When used early in the season such an ovicide can prevent the hatching of overwintering eggs and thus effectively curtail development of a serious mite infestation.

It was also found that 2-butynyl 3-((4-methylphenyl)azo)-2-butenoate has a strong repellent effect causing mites to leave treated leaves or plants. Moreover, from observations of repellency it is apparent that a high percentage of those mites that do leave the treated surface are not able to escape quickly enough to avoid being killed by the miticide.

EXAMPLE 3

Synthesis and miticidal activity of 2-propynyl 3-((4-methylphenyl)azo)-2-butenoate (a) The intermediate 2-propynyl acetoacetate was prepared in a procedure similar to that described in Example 1(a) as follows: 42.0 grams of diketene was added dropwise to a mixture of 28.1 grams of 2-propyn-1-ol and 0.4 gram of sodium acetate maintained at a temperature of 75–85°. After the addition was complete the mixture was stirred for two hours at a temperature of 80–85°, then allowed to cool to room temperature. The product, 2-propynyl acetoacetate, distilled at 93° at 10 mm. Hg yield 41.8 grams.

(b) Following the general procedure of Example 1(b) the intermediate ester was converted to 2-propynyl 2-chloroacetoacetate as follows: 40.5 grams of sulfuryl chloride was added dropwise to 41.8 grams of 2-propynyl acetoacetate which had been chilled to 0–5°. After the addition was complete the stirred mixture was warmed to room temperature, held at room temperature for one hour, warmed on a steam bath for 20 minutes, and then cooled. The reaction mixture was taken up in 100 ml. of methylene chloride and the solution washed and dried as in Example 1(b). Removal of the solvent in vacuo gave 41.7 grams of 2-propynyl 2-chloroacetoacetate.

(c) The chloroacetoacetate was converted to 2-propynyl 3-((4-methylphenyl)azo)-2-butenoate according to the method of Example 1(c). The reagent quantities were 41.7 grams of 2-propynyl chloroacetoacetate, 37.9 grams of 4-methylphenylhydrazine hydrochloride, and 65.1 grams of sodium acetate trihydrate. The precipitate was filtered and dried to give 65.0 grams of 2-propynyl 3-((4-methylphenyl)azo)-2-butenoate. Recrystallized from absolute methanol the product melted at 85–87°.

*Analysis.*—Calc'd for $C_{14}H_{14}N_2O_2$ (percent): C, 69.40; H, 5.82; N, 11.57. Found (percent): C, 69.55; H, 5.81; N, 11.27.

(d) When tested by the methods described in Example 2, at 312 p.p.m. 2-propynyl 3-((4-methylphenyl)azo)-2-butenoate gave 100% control of mites and 100% control of mite eggs.

EXAMPLE 4

Synthesis and miticidal activity of methyl 3-((4-chlorophenyl)azo)-2-butenoate (a) The intermediate methyl 2-chloroacetoacetate was prepared by the reaction of sulfuryl chloride with methyl acetoacetate according to the procedure of Example 1(b). The product boiled at 83–85° at 21–22 mm. Hg.

(b) By the method of Example 1(c) 17.9 grams of 4-chlorophenylhydrazine hydrochloride was reacted with 15.1 grams of methyl 2-chloroacetoacetate in the presence of 27.2 grams of sodium acetate trihydrate to form methyl 3-((4-chlorophenyl)azo)-2-butenoate. The product, recrystallized from ethanol, melted at 77.5–78°.

Analysis. — Calc'd for $C_{11}H_{11}ClN_2O_2$ (percent): C, 55.35; H, 4.65; Cl, 14.86; N, 11.74. Found (percent): C, 55.31; H, 4.70; Cl, 14.66; N, 11.64.

(c) When tested by the methods described in Example 2, methyl 3-((4-chlorophenyl)azo)-2-butenoate at 312 p.p.m. gave 100% control of mites and 100% control of mite eggs.

EXAMPLE 5

Synthesis and miticidal activity of ethyl 3-((4-methoxyphenyl)azo)-2-butenoate (a) By the procedure of Example 1(c), except that the reaction was conducted under a nitrogen atmosphere, 6.9 grams of 4-methoxyphenylhydrazine was reacted with 8.3 grams of ethyl 2-chloroacetoacetate in the presence of 6.8 grams of sodium acetate trihydrate to form ethyl 3-((4-methoxyphenyl)azo)-2-butenoate. The product was recrystallized from ethanol; M.P. 74–75° C.

Analysis.—Calc'd for $C_{13}H_{16}N_2O_3$ (percent): C, 62.88; H, 6.50; N, 11.29. Found (percent): C, 63.15; H, 6.62; N, 11.60.

(b) When tested by the methods described in Example 2, ethyl 3-((4-methoxyphenyl)azo)-2-butenoate at 312 p.p.m. gave 100% control of mites and 100% control of mite eggs.

EXAMPLE 6

Synthesis and miticidal activity of methyl 3-((4-chlorophenyl)azo)-2-propenoate (a) The intermediate methyl α-chloro-β-ketopropionate was prepared as follows: Under a nitrogen atmosphere in a flask equipped with a stirrer, a condenser, a mercury trap, and an equilibrated dropping funnel, 37 grams of ethyl formate was added to a stirred mixture of 19.5 grams of sodium hydride in one liter of dry benzene. Fifteen drops of absolute ethanol were added, and after evolution of hydrogen stopped, dropwise addition of 54.3 grams of methyl chloroacetate was started. After addition of about one-fifth of the chloroester, addition was stopped until the induction period had passed, i.e. until the reaction had started, become vigorous, and subsided somewhat. Dropwise addition was then completed. After standing overnight the reaction mixture was stirred while 20 ml. of absolute ethanol was added to decompose any remaining sodium hydride. The reaction mixture was dissolved in 500 ml. of ice water and the solution washed twice with cold ether, first with 500 ml., then with 250 ml. The aqueous phase was saturated with sodium chloride and then chilled and stirred while concentrated hydrochloric acid was slowly added until the pH reached 1. The acidified solution was extracted with three 100 ml. portions of methylene chloride. The combined methylene chloride extracts were washed four times with 50 ml. portions of saturated sodium chloride solution and then dried over anhydrous sodium sulfate. After removal of the solvent the product, methyl α-chloro-β-ketopropionate was distilled, boiling at 64.5–79° at 22 mm. Hg.

(b) By the method of Example 1(c) 17.9 grams of 4-chlorophenylhydrazine and 13.7 grams of methyl α-chloro-β-ketopropionate were reacted in the presence of 27.2 grams of sodium acetate trihydrate to form methyl 3-((4-chlorophenyl)azo)-2-propenoate. The product, recrystallized from hexane, melted at 117–120°.

Analysis.—Calc'd for $C_{10}H_9ClN_2O_2$ (percent): C, 53.46; H, 4.04; N, 12.47; Cl, 15.78. Found (percent): C, 53.59; H, 3.99; N, 12.47; Cl, 15.92.

(c) When tested by the method described in Example 2(b) methyl 3-((4-chlorophenyl)azo)-2-propenoate at 156 p.p.m. gave 100% control of mite eggs.

EXAMPLES 7 THROUGH 30

By means of the synthetic methods exemplified above an extensive series of the miticidal compounds of the invention was prepared. When tested by the methods of Example 2 the compounds listed in Table II demonstrated 100% control of mites or mite eggs, or both, at 1250 p.p.m. or lower concentration. Where control was less than complete, the percent kill at 1250 p.p.m. is given, unless otherwise noted. For each compound the melting point is given. For those compounds known to be previously reported in the chemical literature, the literature melting point is given in parentheses.

TABLE II.—COMPOUNDS SHOWING 100% CONTROL OF MITES AT 1,250 P.P.M. OR LOWER

| Example No. | Compound | Melting point | Percent Control of— Mites | Percent Control of— Eggs |
|---|---|---|---|---|
| 7 | Ethyl 3-((4-methylphenyl)azo)-2-butenoate | 86–87 (86) | 100 | 100 |
| 8 | Methyl 3-((4-methylphenyl)azo)-2-butenoate | 66–66.5 | 100 | 100 |
| 9 | Methyl 3-(phenylazo)-2-propenoate | 96 | 100 | 100 |
| 10 | 2-butynyl 3-((4-methylphenyl)azo)-2-butenoate | 73–73.5 | 100 | 100 |
| 11 | 2-methoxyethyl 3-((4-methylphenyl)azo)-2-butenoate | 88–88.5 | 100 | 100 |
| 12 | Methyl 3-((4-methoxyphenyl)azo)-2-butenoate | 69–69.5 | 100 | 100 |
| 13 | Methyl 3-((4-methoxyphenyl)azo)-2-propenoate | 115–115 | 100 | 100 |
| 14 | Ethyl 3-((4-chlorophenyl)azo)-2-methyl-2-butenoate | 47–48 | 99 | 100 |
| 15 | Ethyl 3-(phenylazo)-2-butenoate | 49–50 (51) | 100 | 100 |
| 16 | Ethyl 3-((4-bromophenyl)azo)-2-butenoate | 78.5–79.5 (81) | 80 | 100 |
| 17 | Ethyl 3-((4-chlorophenyl)azo)-2-butenoate | 79–80 (80) | 100 | 100 |
| 18 | Ethyl 3-((3-methylphenyl)azo)-2-butenoate | 36–36.5 | 72 | 100 |
| 19 | Ethyl 3-((4-fluorophenyl)azo)-2-butenoate | 50–50.5 | 100 | 100 |
| 20 | Ethyl 3-((2,5-dichlorophenyl)azo)-2-butenoate | 77–78 | 100 | 1 99 |
| 21 | Methyl 3-(phenylazo)-2-butenoate | 42.5–43 (46) | 100 | 100 |
| 22 | Ethyl 3-((3,4-dimethylphenyl)azo)-2-butenoate | 59–60 | 100 | 100 |
| 23 | Ethyl 3-((3-chloro-4-methylphenyl)azo)-2-butenoate | 53.5–54 | 100 | 100 |
| 24 | Ethyl 3-((4-methylphenyl)azo)-2-propenoate | 64.5–65 | 100 | 100 |
| 25 | Ethyl 3-((4-chlorophenyl)azo)-2-propenoate | 102.5–103 | 100 | 100 |
| 26 | 3-butynyl 3-((4-methylphenyl)azo)-2-butenoate | 93–94 | 46 | 100 |
| 27 | Methyl 3-((4-methylphenyl)azo)-2-propenoate | 89–92 | 100 | 100 |
| 28 | Ethyl 3-((4-methylthiophenyl)azo)-2-butenoate | 58–60 | 27 | 100 |
| 29 | 2-propynyl 3-((4-methoxyphenyl)azo)-2-butenoate | 85–88 | 32 | 100 |
| 30 | 2-propynyl 3-((4-chlorophenyl)azo)-2-butenoate | 105–107 | 100 | 100 |

1 At 312 p.p.m.

The compounds exemplified in Table II illustrate the wide range of compounds within the scope of the invention that show a high degree of miticidal activity. Many additional compounds having significant and effective miticidal activity may be prepared by the synthetic methods exemplified above, including the following:

3-ethoxypropyl 3-(phenylazo)-2-propenoate
2-butynyl 3-((4-methoxyphenyl)azo)-2-butenoate
Ethyl 3-((2-methylphenyl)azo)-2-butenoate
Ethyl 3-((2,4,6-trichlorophenyl)azo)-2-butenoate
t-Butyl 3-((4-methylphenyl)azo)-2-butenoate
Ethyl 3-(phenylazo)-2-propenoate
i-Propyl 3-((4-chlorophenyl)azo)-2-propenoate
Hexyl 3-((4-methylphenyl)azo)-2-butenoate
3-methylbutyl 3-((4-methylphenyl)azo)-2-butenoate
Ethyl 3-((4-methylphenyl)azo)-2-hexenoate
Ethyl 3-((4-chlorophenyl)azo)-2-hexenoate In addition to the two-spotted mite, other mite species of economic importance are also controlled by the compounds of this invention as is demonstrated by the following example:

EXAMPLE 31

Activity of 2-butynyl 3-((4-methylphenyl)azo)-2-butenoate against European red mites McIntosh apple trees growing in an orchard and having natural infestations of European red mites (*Panonychus ulmi* (Koch)) were treated as follows: Three different treatment levels of 2-butynyl 3-((4-methylphenyl)azo)-2-butenoate were used, containing 0.125, 0.25, and 0.5 lb./100 gal. of active miticide (156, 312, and 625 p.p.m. respectively). The solutions for spraying were prepared by diluting a 20% emulsifiable concentrate with water to obtain the specified level of active ingredient. The emulsifiable concentrate consisted of the following materials: 2-butynyl 3-((4-methylphenyl)azo)-2-butenoate, 20%; xylene, 75%; a mixture of surface active agents (an alkyl arylsulfonate, an ethylene oxide condensate of an alkylated phenol, and a polyalkylene glycol), 5%. For each treatment, a single, mite-infested McIntosh apple tree was sprayed to run-off by means of a sprayer having a discharge capacity of 25 gal./min. at 600 p.s.i. A designated untreated tree was kept as a control. Before spraying, and at intervals thereafter, a number of leaves from each tree were removed and examined for mites. Reported as mites are all active forms (larvae, nymphs, and adults). Results are given in Table III.

TABLE III.—EVALUATION OF 2-BUTYNYL 3-((4-METHYLPHENYL)AZO)-2-BUTENOATE AGAINST EUROPEAN RED MITES AT VARIOUS CONCENTRATIONS

| Days after treatment | Number of living mites per 50 leaves (p.p.m.) | | | |
|---|---|---|---|---|
| | 0 | 156 | 312 | 625 |
| 0 | ¹122 | ¹232 | ¹344 | ¹456 |
| 1 | 392 | 32 | 12 | 12 |
| 2 | 349 | 0 | 5 | 1 |
| 3 | 324 | 0 | 0 | 0 |
| 6 | 224 | 0 | 0 | 0 |
| 13 | 108 | 84 | 36 | 28 |

¹ Count before spraying for a 25 leaf sample from each tree.

The results in Table III show that in just one day the miticide of the invention at all treatment levels has very substantially reduced the mite population. Moreover, control of mites was essentially complete from the second through the sixth day after spraying. Even after thirteen days the effect of the miticide was still apparent.

The miticidal compounds of the invention may be formulated with additives and extenders commonly used in the preparation of pesticidal compositions. These miticides, like most pesticidal agents, are not generally applied full strength. More frequently they will be incorporated with any of the adjuvants and carriers normally employed for facilitating the dispersion of active ingredients, recognizing the accepted fact that the formulation and mode of application of a toxicant may affect the activity of the material. The compounds of this invention may be applied for example, as sprays, dusts, or granules, to the area in which mite control is desired, the choice of application varying, of course, with the specific mites to be controlled and the environment. Thus, these compounds may be formulated as granules of large particle size, as powdery dusts, as wettable powders, as emulsifiable concentrates, as solutions, and the like. These formulations may contain as little as 0.5 or as much as 95% or more by weight of the active ingredient.

Dusts are admixtures of the active ingredients with finely divided solids such as talc, attapulgite clay, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than abolt 50 microns. A typical dust formulation useful herein contains 10.0 parts of 2-butynyl 3-((4-methylphenyl)azo)-2-butenoate, 30.0 parts of bentonite clay and 60.0 parts talc.

The miticidal compounds may be made into liquid concentrates by solution or emulsion in suitable liquids, and into solid concentrates by admixture with talc, clays and other known solid carriers used in the pesticide art. Concentrates are compositions containing about 5–50% miticide and the rest inert material such as dispersing agents, emulsifying agents, and wetting agents. These concentrates are diluted for practical application, with water or other liquid sprays or with additional solid carrier for use as dusts. Typical carriers for solid concentrates (also called wettable powders) include fuller's earth, kaolin clays, silicas, and other highly absorbent, readily wet inorganic diluents. A useful solid concentrate formulation for use herein contains 25.0 parts of methyl 3-((4-chlorophenyl)-azo)-2-propenoate, 72.0 parts of bentonite clay and 1.5 parts each of sodium lignosulfonate and sodium laurylsulfonate as wetting agents.

Useful liquid concentrates include the emulsifiable concentrates, which are homogeneous liquid or paste compositions readily dispersible in water or other liquid carriers, and which may consist entirely of novel miticide with a liquid or solid emulsifyng agent, or may also contain a liquid carrier, such as xylene, heavy aromatic naphthas, isophorone and other relatively non-volatile organic solvents. For application these concentrates are dispersed in water or other liquid carrier, and normally applied as a spray to the area to be treated.

The concentration of miticide generally useful for control of mites and mite eggs is normally in the range of about 2% to about 0.001%. Many variations of spraying and dusting compositions in the art may be used, by substituting the novel compounds of this invention into compositions known or apparent to the pesticide art.

Typical wetting, dispersing or emulsifying agents used in pesticidal formulations include, for example, the alkyl and alkylaryl sulfonates and sulfates and their sodium salts, alkylamide sulfonates, including fatty methyl taurides; salts of long chain quaternary amines; alkylaryl polyether alcohols; sulfated higher alcohols; polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce. The surface active agent, when used, normally comprises from 1 percent to 15 percent by weight of the pesticidal composition.

Other useful formulations include simple solutions of the active ingredient in a dispersant in which it is completely soluble at the desired concentration, such as acetone or other organic solvents. Granular formulations, wherein the miticide is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may be used.

The miticidal compositions of this invention may be formulated and applied with other active ingredients, including other miticides, insecticides, fungicides, nematocides, plant growth regulators, fertilizers, etc. In applying the chemicals, it is obvious that an effective amount and concentration of miticide should be employed.

I claim:

1. A miticidal composition comprising (a) as an essential active ingredient a miticidally effective amount of a compound of the formula

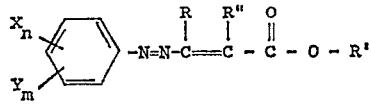

wheren R is hydrogen or an aliphatic hydrocarbon group of one to three carbon atoms inclusive; R" is hydrogen or methyl, R' is lower alkyl, lower alkynyl or lower alkoxyalkyl; X is halogen, methyl, methoxy, or methylthio; Y is methyl or chloro; $n$ is 0 or 1; and $m$ is 0, 1, 2; (b) an inert liquid or solid pesticidal carrier; and (c) a surface active agent.

2. The miticidal composition of claim 1 wherein R is hydrogen or methyl; R" is hydrogen; and X is chlorine, bromine, fluorine, methyl, methoxy, or methylthio.

3. The miticidal composition of claim 2 wherein X is in the para position to the azo group.

4. The miticidal composition of claim 3 wherein R' is methyl, ethyl, 2-propynyl, 2-butynyl, or 2-methoxyethyl and X is chloro, methyl, or methoxy.

5. The miticidal composition of claim 4 wherein $m$ is 0.

6. A method of protecting plants from mites which comprises applying to the plants to be protected a miticidally effective amount of a compound of the formula

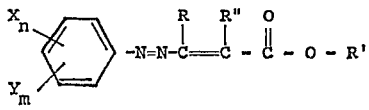

wherein R is hydrogen or an aliphatic hydrocarbon group of one to three carbon atoms inclusive; R" is hydrogen or methyl, R' is lower alkyl, lower alkynyl or lower alkoxyalkyl; X is halogen, methyl, methoxy, or methylthio; Y is methyl or chloro; $n$ is 0 or 1; and $m$ is 0, 1, or 2.

7. The method of claim 6 wherein R is hydrogen or methyl, R" is hydrogen; and X is chlorine, bromine, fluorine, methyl, methoxy, or methylthio.

8. The method of claim 7 wherein X is in the para position to the azo group.

9. The method of claim 8 wherein R' is methyl, ethyl, 2-propynyl, 2-butynyl, or 2-methoxyethyl and X is chloro, methyl, or methoxy.

10. The method of claim 9 wherein $m$ is 0.

References Cited

Chemical Abstracts, vol. 33, pp. 4211–4212 (1939); vol. 40, pp. 3439–3440 (1946); vol. 41, pp. 407–410 (1947); vol. 51, pp. 15500–15501 (1957).

ALBERT T. MEYERS, Primary Examiner

F. E. WADDELL, Assistant Examiner